United States Patent Office 3,268,398
Patented August 23, 1966

3,268,398
CYCLOHEXENE - 1,2 - DICARBOXIMIDO METHYL ESTERS OF CYCLOPROPANE CARBOXYLIC ACID ESTERS AND INSECTICIDAL COMPOSITIONS THEREOF
Takeaki Kato and Kenzo Ueda, Nishinomiya-shi, Sadao Horie, Fuse-shi, Toshio Mizutani, Amagasaki-shi, Keimei Fujimoto, Minoo-shi, and Yositosi Okuno, Nishinomiya-shi, Japan, assignors to Sumitomo Chemical Company, Ltd., Osaka, Japan, a corporation of Japan
No Drawing. Filed Apr. 6, 1964, Ser. No. 357,756
Claims priority, application Japan, Apr. 11, 1963, 38/19,155, 38/19,156; Aug. 13, 1963, 38/42,808; Aug. 29, 1963, 38/46,050; Dec. 17, 1963, 38/68,215; Dec. 19, 1963, 38/68,673
11 Claims. (Cl. 167—33)

This invention relates to novel cyclopropenecarboxylic acid esters, to a process for preparing the same, and to insecticidal compositions containing the same. More particularly, it relates to novel cyclopropanecarboxylic acid esters having the general formula:

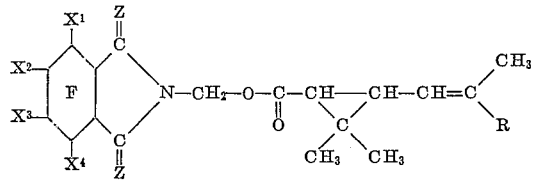

wherein $X^1$, $X^2$, $X^3$ and $X^4$ each means a member selected from the group consisting of hydrogen and halogen atoms, and methyl, and acetoxy radicals; Z is a member of oxygen and sulfur atoms; F means a double bond at any position of the cyclohexane nucleus, and R is a member selected from methyl and methoxycarbonyl radicals; to a process for preparing the same; and to insecticidal compositions containing the same.

It is one object of the invention to provide a novel group of cyclopropanecarboxylic acid esters, particularly of chrysanthemum carboxylic acid esters, which have strong insecticidal activities to house and agricultural insects with low toxicities to warm-blooded animals and plants, and which can be commercially produced in low cost. Another object is to provide a process for preparing such novel esters by a commercially available procedure. Still another object is to provide insecticidal compositions containing such an ester. Other objects would be obvious from the following description.

As an insecticide utilizable with safety because of the harmlessness to warm-blooded animals, pyrethrum extract has long been employed. Recently, allethrin which is an analog of the effective ingredients in pyrethrum extract, i.e. pyrethrin and cinerin, was synthesized and developed for insecticidal uses. These ingredients are surely valuable in their high insecticidal powers, especially in their rapid effect to insects, and in the characteristics of permitting no, or little, resistivity to insects. However, their uses are limited to some extent because of their complicated steps of the production and their great expenses for the production.

The present inventors have made broad researches on the various cyclopropanecarboxylic acid esters, and have now found the present novel group of cyclopropanecarboxylic acid esters, which possess significant insecticidal power but are harmless to warm-blooded animals, and which can be prepared from easily available materials by a simple process with low prices. In other words, the present compounds are tetrahydro(thio)phthalimidomethyl esters of chrysanthemum carboxylic acids. Accordingly, it is a feature of the present invention that the characteristics of the present compounds resemble to pyrethrin, cinerin and allethrin, even though the alcohol moieties of the former are extremely simple as compared to those of the latter and are composed of carbon, hydrogen, oxygen, (sulfur) and nitrogen atoms, unlike the latter composed of carbon, hydrogen and oxygen.

Thus, the present invention is to provide novel cyclopropanecarboxylic acid esters having the formula,

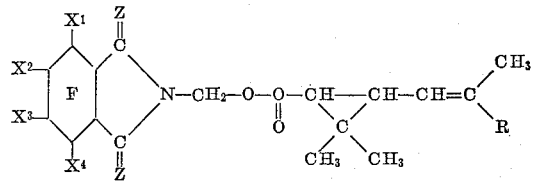

wherein $X^1$, $X^2$, $X^3$, $X^4$, Z, F and R have the same meanings as identified above, and to provide a process for preparing such compounds, comprising esterifying a tetrahydrophthalimide compound having the general formula,

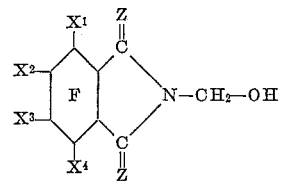

wherein $X^1$, $X^2$, $X^3$, $X^4$, Z and F have the same meanings as identified above, with a cyclopropanecarboxylic acid having the general formula,

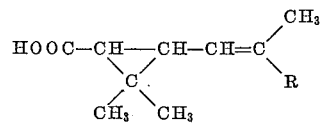

wherein R has the same meaning as identified above, according to the general esterifying procedure.

The tetrahydrophthalimide compounds employed in the present invention, in other words, N-methylol-tetrahydrophthalimides or N-(hydroxymethyl)-cyclohexene-1,2-dicarboximides, may be prepared from tetrahydrophthalic acid, its anhydride, its imide compound, or their nucleus-substituted compounds, according to the conventional procedures well-known to those skilled in the art. For instance, N-(hydroxymehyl)-1-cyclohexene - 1,2 - dicarboximide may be prepared by reaction of 1-cyclohexene-1,2-dicarboximide with formaldehyde or its low molecular weight polymer according to the conventional methylolation conditions in the presence or absence of an alkaline catalyst, such as sodium hydroxide and potassium carbonate, in a solvent, such as water, benzene, and toluene. Similarly, various N-(hydroxymethyl)-cyclohexene-1,2-dicarboximide, such as 4-cyclohexene, 3-methyl-4-cyclohexene, 4-methyl-4-cyclohexene, 3,4,5,6-tetramethyl - 4 - cyclohexene, 3-chloro-4-cyclohexene, 3-bromo-4-cyclohexene, 3,6-dichloro-4-cyclohexene, 3-cyclohexene, 5-methyl-3-cyclohexene, 4-methyl-1-cyclohexene, 3,6-dimethyl-4-cyclohexene, 1-methyl-4-cyclohexene, 3-methyl-1-cyclohexene, 3,6-dimethyl-1-cyclohexene, 3-acetoxy-4-cyclohexene, and the like compounds, and the corresponding mono- or dithiodicarboximide compounds, may be prepared.

The cyclopropanecarboxylic acid employed in the present invention is either chrysanthemic acid (chrysanthemum monocarboxylic acid; R being $CH_3$) or pyrethric acid (R being $COOCH_3$, a monomethyl ester of chrysanthemum dicarboxylic acid). They are the acidic moieties of pyrethrin, cinerin and allethrin, and can be synthesized according to the known method.

The esterification reaction of the present invention may be effected in various way. The tetrahydrophthalimide compound may be heated with the cyclopropanecarboxylic acid in the presence of a strong acid, such as aromatic sulfonic acid and sulfuric acid, in an organic solvent capable of azeotropically boiling with water, thereby to remove the water formed in the esterification, out of the reaction system. It may also be heated with a lower alkyl ester of the cyclopropanecarboxylic acid in the presence of a basic catalyst, such as sodium, potassium, sodium alcoholate and potassium alcoholate, thereby to continuously remove the lower alcohol formed through the ester-exchanging reaction out of the reaction system. In such case, methyl, ethyl, n-propyl and isopropyl ester are suitable. In the most preferable esterification, it may be treated with the cyclopropanecarboxylic acid halide in an inert organic solvent, preferably in the presence of a dehydrogen halide agent, such as pyridine, triethylamine and other tertiary amine whereby the esterification is proceeded with the isolation of a hydrohalic acid salt within a short period of time. In this case, the acid chloride is the most preferable, though the bromide and the iodide may be employable. Further, it may be refluxed with the cyclopropanecarboxylic acid anhydride in an inert solvent for several hours, thereby to yield the objective ester and free cyclopropanecarboxylic acid, the latter being recovered and again converted to the anhydride by treatment with, for example, acetic anhydride for reuse. Alternatively, the tetrahydrophthalimide compound may be employed for the esterification by being converted to the form of the halide having the general formula,

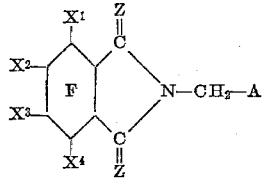

wherein $X^1$, $X^2$, $X^3$, $X^4$, Z and F have the same meanings as identified above, and A means a halogen atom. In this case, the halide may be heated with an alkali metal or ammonium salt of the cyclopropanecarboxylic acid in an inert solvent, thereby to yield the objective ester with the isolation of an alkali metal or ammonium halide salt. Alternatively, the halide may be heated with the free acid in an inert solvent in the presence of a dehydrogen halide agent, such as tertiary amines. In the formula, A may be any of chlorine, bromine, and iodine, among which the former two are preferable and practical. As the alkali metals, sodium and potassium are preferable.

As well-known, the cyclopropanecarboxylic acid as identified above comprises various stereoisomers and optical isomers. It is needless to say that the acid and the derivatives thereof as described herein involve their isomers.

The process of the invention is described in more detail with reference to the following examples, which are however to be construed for the purpose of illustration and not of the limitation.

Example 1

A mixture of 18.1 g. of N-hydroxymethyl-4-cyclohexene-1,2-dicarboximide and 48 ml. of dry pyridine was added with 50 ml. of dry toluene and the mixture was cooled with ice. A solution of 19 g. of chrysanthemoyl chloride in 50 ml. of dry toluene was dropped to the mixture while being stirred. The reaction proceeded exothermically, whereby pyridine-hydrochloric acid salt was isolated in the mixture. The reaction vessel was tightly closed and allowed to stand overnight. The excessive pyridine was neutralized with 5% hydrochloric acid, and the resulting two layers were separated from each other. The organic layer was washed with a saturated sodium bicarbonate solution and then with a saturated sodium chloride solution, and dried over sodium sulfate. Evaporation of the solvent in vacuo and recrystallization of the residue from ligroin yielded 28.5 g. of N-(chrysanthemoxymethyl)-4-cyclo-hexene-1,2-dicarboximide (M.P. 100°–107° C., colorless leaflets).

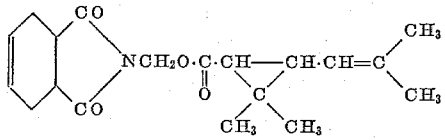

Analysis.—Found: C, 69.00; H, 7.58; N, 4.30%. Calculated (as $C_{19}H_{25}NO_4$): C, 68.86; H, 7.60; N, 4.23%.

Example 2

A mixture of 19.5 g. of N-(hydroxymethyl)-3-methyl-4-cyclohexene-1,2-dicarboximide, 20 g. of ethyl chrysanthemate and 20 g. of sodium ethylate was heated at about 150° C. for 3 hours until the almost theoretical amount of ethyl alcohol was distilled off. The reaction mixture was cooled and dissolved in ethyl ether and the solution was washed sequentially with 5% hydrochloric acid, with a saturated sodium bicarbonate solution, and then with a saturated sodium chloride solution, and dried on sodium sulfate. The solvent in the reaction mixture was distilled off. The residue was purified by dissolving in toluene and passing through an alumina column. The pale yellow liquid product, N-(chrysanthemoxymethyl)-3-methyl-4-cyclohexene-1,2-dicarboximide, weighed 27.6 g., $n_D^{20}$ 1.5133.

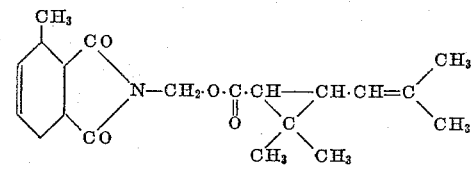

Analysis.—Found: C, 69.35; H, 8.05; N, 3.93%. Calculated (as $C_{20}H_{27}NO_4$): C, 69.54; H, 7.88; N, 4.06%.

Example 3

To a solution of 19.5 g. of N-(hydroxymethyl)-4-methyl-4-cyclohexene-1,2-dicarboximide and 18 g. of chrysanthemic acid in 100 ml. of dry toluene was added 1 g. of p-toluene sulfonic acid. The mixture was refluxed while the formed water was distilled off in azeotrope. After removal of the theoretical amount of water, the reaction mixture was washed with a saturated sodium bicarbonate solution and then with a saturated sodium chloride solution, and dried over sodium sulfate. The solvent was partly distilled in vacuo to remove the residual water, and the solution was passed through an alumina column. The pale yellow viscous liquid product, N-(chrysanthemoxymethyl)-4-methyl-4-cyclohexene-1,2-dicarboximide, weighed 28.0 g., $n_D^{20}$ 1.5129.

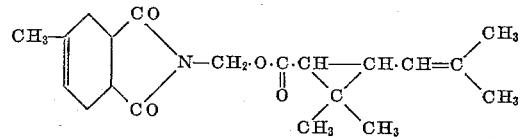

Analysis.—Found: C, 70.01; H, 7.96; N, 4.03%. Calculated (as $C_{20}H_{27}NO_4$): C, 69.54; H, 7.88; N, 4.06%.

Example 4

A mixture of 19.5 g. of N-(hydroxymethyl)-1-methyl-4-cyclohexene-1,2-dicarboximide, 32 g. of chrysanthemic acid anhydride and 60 g. of dry toluene was refluxed for 3 hours, and the reaction mass was washed with an aqueous 3% sodium hydroxide solution at a temperature below 20° C., thereby to remove the by-produced chrysanthemic acid. The reaction mass was then washed with a saturated sodium chloride solution, dried on sodium sulfate, and passed through an alumina column for purification. The pale yellow viscous liquid product, N-(chrysanthemoxymethyl)-1-methyl-4-cyclohexene-1,2-dicarboximide, weighed 31.7 g., $n_D^{19}$ 1.5139.

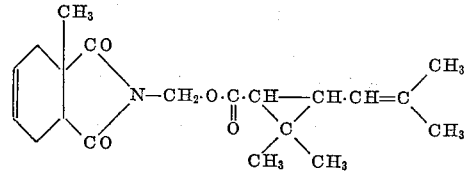

*Analysis.*—Found: C, 69.35; H, 7.74; N, 4.28%. Calculated (as $C_{20}H_{27}NO_4$): C, 69.54; H, 7.88; N, 4.06%.

Example 5

A mixture of 21.4 g. of N-(chloromethyl)-4-methyl-4-cyclohexene-1,2-dicarboximide and 19 g. of sodium chrysanthemate in naphtha was heated to about 150° C. while being stirred, until isolation of sodium chloride was finished. After cooling the reaction mixture was filtered and distilled in vacuo to remove the solvent. The product was purified as described in the preceding examples, and 26.7 g. of the ester same as that described in Example 3 was obtained.

Example 6

According to the procedure as described in Example 1, 20.9 g. of N-(hydroxymethyl)-3,6-dimethyl-4-cyclohexene-1,2-dicarboximide was allowed to react with 19 g. of chrysanthemoyl chloride, to yield 32.3 g. of pale yellow viscous liquid product, N-(chrysanthemoxymethyl)-3,6-dimethyl-4-cyclohexene-1,2-dicarboximide, $N_D^{20}$ 1.5145.

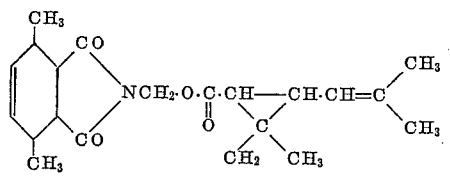

*Analysis.*—Found: C, 70.05; H, 8.13; N, 3.99%. Calculated (as $C_{21}H_{29}NO_4$): C, 70.17; H, 8.13; N, 3.90%.

Example 7

According to the procedure as described in Example 1, 23.7 g. of N-(hydroxymethyl)-3,4,5,6-tetramethyl-4-cyclohexene-1,2-dicarboximide was allowed to react with 19 g. of chrysanthemoyl chloride to yield 36.0 g. of N-(chrysanthemoxymethyl)-3,4,5,6-tetramethyl-4-cyclohexene-1,2-dicarboximide, $N_D^{20}$ 1.5188.

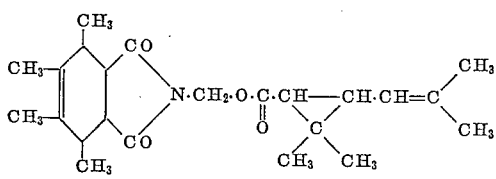

*Analysis.*—Found: C, 71.67; H, 8.43; N, 3.54%. Calculated (as $C_{23}H_{33}NO_4$): C, 71.29; H, 8.58; N, 3.61%.

Example 8

According to the procedure as described in Example 4, 21.6 g. of N-(hydroxymethyl)-3-chloro-4-cyclohexene-1,2-dicarboximide was allowed to react with 32 g. of chrysanthemic acid anhydride to yield 33.5 g. of N-(chrysanthemoxymethyl)-3-chloro-4-cyclohexene-1,2-dicarboximide, $N_D^{20}$ 1.5156.

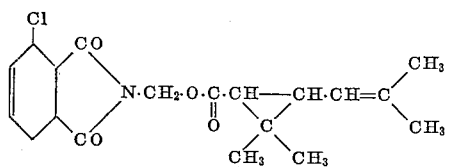

*Analysis.*—Found: C, 62.45; H, 6.55; Cl, 9.83%. Calculated (as $C_{19}H_{24}ClNO_4$): C, 62.37; H, 6.61; Cl, 9.69%.

Example 9

According to the procedure as described in Example 1, 21.1 g. of N-(hydroxymethyl)-3-methyl-4-cyclohexene-1-carboxy-2-thiocarboximide was allowed to react with 19 g. of chrysanthemoyl chloride to yield 32.5 g. of light reddish rose liquid N-(chrysanthemoxymethyl)-3-methyl-4-cyclohexene-1-carboxy-2-thiocarboximide.

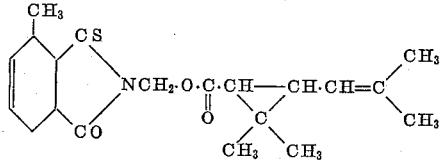

*Analysis.*—Found: C, 66.69; H, 7.48; S, 9.01%. Calculated (as $C_{20}H_{27}NO_3S$): C, 66.45; H, 7.53; S, 8.87%.

Example 10

According to the procedure as described in Example 1, 19.5 g. of N-(hydroxymethyl)-5-methyl-1-cyclohexene-1,2-dicarboximide was allowed to react with 19 g. of chrysanthemoyl chloride to yield 32.8 g. of pale yellow liquid N-(chrysanthemoxymethyl)-5-methyl-1-cyclohexene-1,2-dicarboximide, $N_D^{21}$ 1.5198.

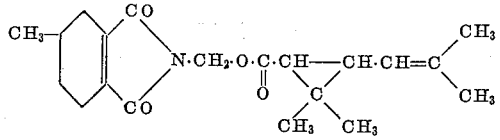

*Analysis.*—Found: C, 70.05; H, 7.71; N, 4.13%. Calculated (as $C_{20}H_{27}NO_4$): C, 69.54; H, 7.88; N, 4.06%.

Example 11

According to the procedure as described in Example 1, 18.1 g. of N-(hydroxymethyl)-1-cyclohexene-1,2-dicarboximide was allowed to react with 19 g. of chrysanthemoyl chloride to yield 29.0 g. of pale yellow viscous N-(chrysanthemoxymethyl-1-cyclohexene-1,2-dicarboximide, $N_D^{21.5}$ 1.5175, M.P. 62°-72° C.

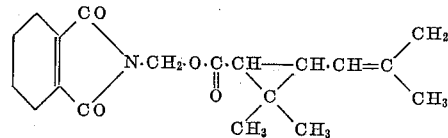

*Analysis.*—Found: C, 69.11; H, 7.58; N, 4.23%. Calculated (as $C_{19}H_{25}NO_4$): C, 68.86; H, 7.60; N, 4.23%.

Example 12

According to the procedure as described in Example 1, 19.5 g. of N-(hydroxymethyl)-3-methyl-1-cyclohexene-1,2-dicarboximide was allowed to react with 19 g. of chrysanthemoyl chloride to yield 31.4 g. of pale yellow liquid N-(chrysanthemoxymethyl)-3-methyl-1-cyclohexene-1,2-dicarboximide, $N_D^{20}$ 1.5200.

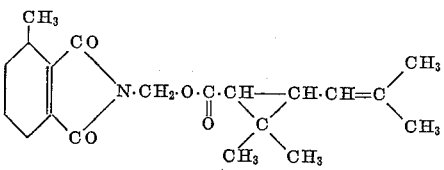

*Analysis.*—Found: C, 69.48; H, 7.91; N, 4.16%. Calculated (as $C_{20}H_{27}NO_4$): C, 69.54; H, 7.88; N, 4.06%.

Example 13

According to the procedure as described in Example 1, 19.7 g. of N-(hydroxymethyl)-1-cyclohexene-1-carboxy-2-thiocarboximide was allowed to react with 19 g. of chrysanthemoyl chloride to yield 31.0 g. of rose red liquid N-(chrysanthemoxymethyl) - 1-cyclohexene-1-carboxy-2-thiocarboximide, $N_D^{19}$ 1.5177.

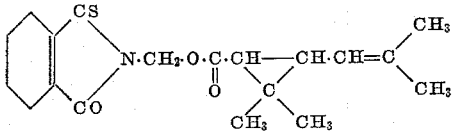

*Analysis.*—Found: C, 65.77; H, 7.24; S, 9.86%. Calculated (as $C_{19}H_{25}NO_3S$): C, 65.67; H, 7.25; S, 9.23%.

Example 14

According to the procedure as described in Example 1, 20.9 g. of N-(hydroxymethyl)-3,6-dimethyl-1-cyclohexene-1,2-dicarboximide was allowed to react with 19 g. of chrysanthemoyl chloride to yield 32.6 g. of liquid N-(chrysanthemoxymethyl)-3,6-dimethyl-1-cyclohexene-1,2-dicarboximide, $N_D^{21}$ 1.5213.

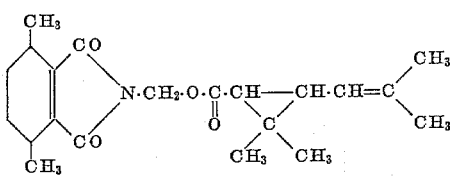

*Analysis.*—Found: C, 70.21; H, 8.05; N, 4.01%. Calculated (as $C_{21}H_{29}NO_4$): C, 70.17; H, 8.13; N, 3.90%.

Example 15

According to the procedure as described in Example 1, 23.9 g. of N-(hydroxymethyl)-3-acetoxy-4-cyclohexene-1,2-dicarboximide was allowed to react with 19.1 g. of chrysanthemoyl chloride to yield 37.7 g. of pale yellow viscous N-(chrysanthemoxymethyl)-3 - acetoxy - 4-cyclohexene-1,2-diacrboximide, $N_D^{30}$ 1.5150.

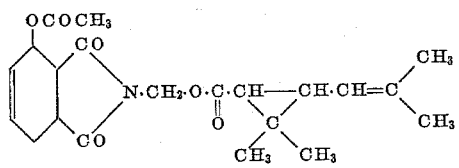

*Analysis.*—Found: C, 64.73; H, 7.01; N, 3.58%. Calculated (as $C_{21}H_{27}NO_6$): C, 64.76; H, 6.99; N, 3.60%.

Example 16

According to the procedure as described in Example 1, N-(hydroxymethyl)-1-cyclohexene-1,2-dicarboximide was allowed to react with pyrethroyl chloride to yield N-(pyrethroxymethyl)-1-cyclohexene-1,2-dicarboximide in 87.5% yield.

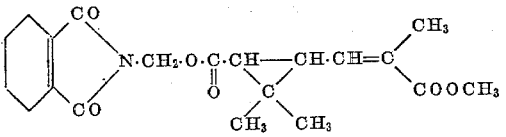

*Analysis.*—Found: C, 64.01; H, 6.70; N, 4.05%. Calculated (as $C_{20}H_{25}NO_6$): C, 63.98; H, 6.71; N, 3.73%.

Example 17

A mixture of 20.0 g. of N-(chloromethyl)-1-cyclohexene-1,2-dicarboximide and 21.2 g. of pyrethric acid were dissolved in 200 ml. of acetone, and 11.1 g. of triethylamine was dropped into the solution at room temperature while being stirred. Thereafter, the mixture was refluxed for 2 hours. The reaction mixture was cooled and filtered to remove the insoluble amine hydrochloride. The filtrate was evaporated in vacuo to remove the solvent, and the residue was dissolved in dry toluene. The solution was washed with water and dried over sodium sulfate. The solution was passed through an alumina column and then evaporated in vacuo to leave N-(pyrethroxymethyl)-1-cyclohexene - 1,2-dicarboximide in 85.0% yield.

*Analysis.*—Found: C, 63.87; H, 6.68; N, 3.85%. Calculated (as $C_{20}H_{25}NO_6$): C, 63.98; H, 6.71; N, 3.73%.

Example 18

According to the procedure as described in Example 1, N-(hydroxymethyl)-3-cyclohexene-1,2-dicarboximide was allowed to react with pyrethroyl chloride to yield N-(pyrethroxymethyl)-3-cyclohexene - 1,2-dicarboximide in 88.0% yield.

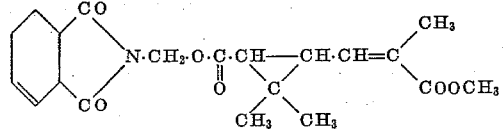

*Analysis.*—Found: C, 63.79; H, 6.94; N, 3.69%. Calculated (as $C_{20}H_{25}NO_6$): C, 63.98; H, 6.71; N, 3.73%.

Example 19

According to the procedure as described in Example 4, N-(hydroxymethyl) - 3-methyl-4-cyclohexene-1,2-dicarboximide was allowed to react with pyrethric acid anhydride to yield N-(pyrethroxymethyl)-3-methyl-4-cyclohexene-1,2-dicarboximide in 81.3% yield.

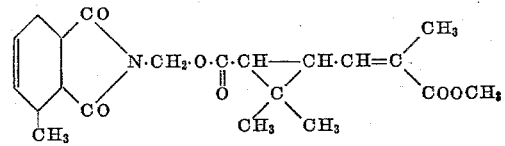

*Analysis.*—Found: C, 64.88; H, 7.09; N, 3.56%. Calculated (as $C_{21}H_{27}NO_6$): C, 64.76; H, 6.99; N, 3.60%.

Example 20

According to the procedure as described in Example 1, N-(hydroxymethyl) - 3-acetoxy - 4-cyclohexene-1,2-dicarboximide was allowed to react with pyrethroyl chloride to yield N-(pyrethroxymethyl)-3-acetoxy-4-cyclohexene-1,2-dicarboximide in 88.5% yield.

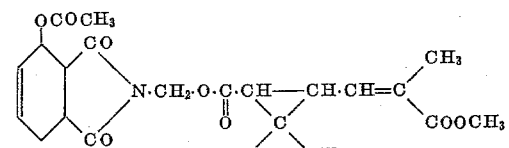

*Analysis.*—Found: C, 61.00; H, 6.25; N, 3.21%. Calculated (as $C_{22}H_{27}NO_8$): C, 60.96; H, 6.28; N, 3.23%.

As mentioned above, the present esters possess superior insecticidal power, and exhibit rapid knock down and excellent killing effect to houseflies, mosquitos, cockroaches, etc. Moreover, these esters are especially useful for sanitary and domestic purposes, because of their rapid effectiveness and harmlessness (for example, N-(chrysanthemoxymethyl)-1-cyclohexene - 1,2-dicarboximide shows oral toxicity to mice in $LD_{50}$ value of more than 800 mg./kg.). The present esters are suitably employed for the preparation of insecticidal compositions which have broad uses, correlatively with the low cost.

For the formulation of the insecticidal composition containing the present compound as the essential ingredient, oil solution, emulsifiable concentrate, wettable powder, dust, aerosol, mosquito coil, bait and other preparations, may be formulated using the generally employed carriers, diluents or auxiliary agents, according to the method known to those skilled in the art in the cases of the formulation of pyrethrum extract and allethrin. If the compound is crystalline, it is preferably employed as a preliminarily prepared solution in an organic solvent, such as acetone, xylene, methylnaphthalene, etc., depending upon the type of the formulation.

If desired, the present esters may be employed for the preparation of the insecticidal compositions in combination with other insecticidal component, such as pyrethroide, for example, pyrethrum extract and allethrin, organochlorine and organophosphorus compounds, synergistic agent for pyrethroide, for example, piperonyl butoxide, piperonyl sulfoxide, β-butoxy-β'thiocyanodiethyl ether and the like. By combination with such other ingredient, the present insecticidal composition can be adapted to broader uses with more increased effect.

Concretely speaking, the present esters may be blended with at least one of pyrethrin, allethrin, O,O-dimethyl-O-(3-methyl-4-nitrophenyl) thiophosphate, malathion, diazinone, dimethoate, γ-BHC, and others, to yield a pesticidal composition which possesses high insecticidal activity with rapid effectivity. In such cases, the both components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the formula

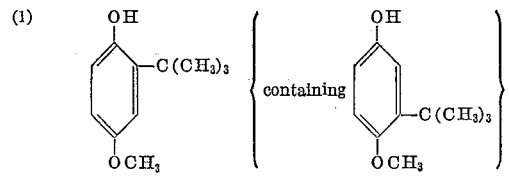

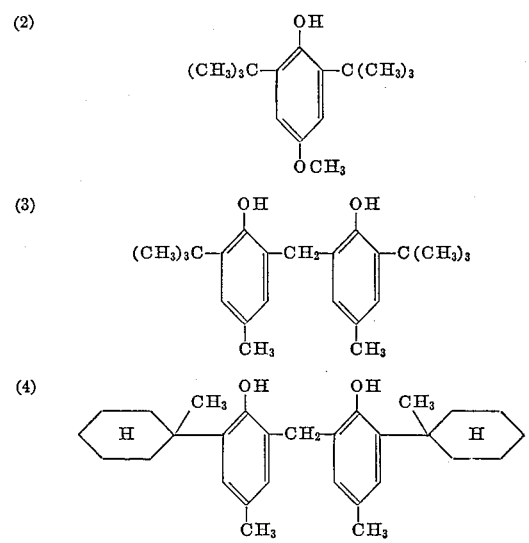

The amount of the stabilizer, if added, may be less than 1% by weight of the present ester, ordinarily from 1 to 0.1%.

The followings are the illustrations of the insecticidal compositions containing the cyclopropanecarboxylic acid esters according to the invention and of the insecticidal activities.

*Example 21*

A solution of 0.5 g. of N-(chrysanthemoxymethyl)-4-cyclohexene-1,2-dicarboximide in 1 g. of xylene was diluted with a refined kerosene to make the volume 100 ml., whereby 0.5% oil preparation was obtained.

By turn-table method, each 5 ml. of the 0.5% oil preparation or that diluted with a refined kerosene was sprayed to about 100 houseflies (adult) within 10 seconds. After 20 seconds, the shutter was opened and the houseflies were allowed to expose to the sprayed mist for 10 minutes. Then, the houseflies were transferred to a cage, and the knock-down number was counted. After 24 hours, kill number was also observed.

| Concentration of the ingredient (percent) | Knock-down ratio (percent) (after 10 min.) | Mortalities (percent) |
|---|---|---|
| 0.5 | 90.5 | 71.2 |
| 0.25 | 80.1 | 40.8 |
| 0.125 | 45.3 | 22.5 |

*Example 22*

A 100 ml. refined kerosene solution containing 0.4 g. of N - (chrysanthemoxymethyl) - 3 - methyl - 4 - cyclohexene-1,2-dicarboximide was prepared.

In a glass box of 70 cm. cube, about 30 houseflies (adult) were liberated, and 0.3 ml. of the thus-prepared 0.4% oil preparation was uniformly sprayed with an atomizer into the box. Knock-down number of the houseflies according to the lapse of time were observed. Similarly, a 0.4% oil preparation containing allethrin was tested for comparison.

*Knock-down ratio of houseflies according to the lapse of time, percent*

|  | 30 sec. | 42 sec. | 1 min. | 1¼ min. | 2 min. | 2⅔ min. | 4 min. | 5⅔ min. | 8 min. |
|---|---|---|---|---|---|---|---|---|---|
| The present compound | 0.8 | 4.0 | 15.2 | 36.2 | 43.1 | 56.6 | 70.9 | 75.4 | 80.4 |
| Allethrin | 2.9 | 9.6 | 19.1 | 34.3 | 42.2 | 57.9 | 71.0 | 84.2 | 92.4 |

*Example 23*

An emulsifiable concentrate was obtained by uniformly mixing 10 g. of N-(chrysanthemoxymethyl)-3-chloro-4-cyclohexene-1,2-dicarboximide, 80 g. of xylene and 10 g. of Sorpol SM–200 (a surface active agent, trade-name of Toho Chemical Co., Ltd.).

The resulting 10% emulsifiable concentrate was diluted with water, and each 10 ml. was sprayed onto houseflies (adult) in a settling-tower within 10 seconds. After 5 seconds, the shutter was opened and the houseflies were exposed to the sprayed mist for 10 minutes and then taken out from the settling tower. The houseflies were kept at a constant temperature and the mortality was examined after 20 hours.

| Concentration of the ingredient: | Mortality, (percent) |
|---|---|
| 1.0 | 97.8 |
| 0.5 | 80.3 |
| 0.25 | 53.2 |
| 0.125 | 24.6 |

*Example 24*

A 100 ml. refined kerosene solution containing 0.5 g. of N - (chrysanthemoxymethyl) - 3 - methyl - 1 - cyclohexene-1,2-dicarboximide and 1 g. of xylene was prepared.

In a glass box of 70 cm. cube, about 30 houseflies (adult) were liberated, and 0.3 ml. of the thus-prepared 0.5% oil preparation was uniformly sprayed with an atomizer into the box. Knock-down number of the houseflies according to the lapse of time were observed. Similarly, a 0.3% oil preparation containing allethrin was tested for comparison.

methyl)-3-acetoxy-4-cyclohexene-1,2-dicarboximide and 5 g. of xylene was prepared and tested.

*Example 28*

In similar way as in Example 23, a 10% emulsifiable concentrate was prepared from 10 g. of N-(chrysanthemoxymethyl)-3-acetoxy-4 - cyclohexene - 1,2 - dicarboximide, 80 g. of xylene and 10 g. of Sorpol SM–200 (a surface active agent, trade-name of Toho Chemical Co., Ltd.), and tested.

*Knock-down ratio of houseflies according to the lapse of time, percent*

|  | 30 sec. | 42 sec. | 1 min. | 1½ min. | 2 min. | 2⅚ min. | 4 min. | 5⅔ min. | 8 min. |
|---|---|---|---|---|---|---|---|---|---|
| The present compound | 2.1 | 6.3 | 12.4 | 20.7 | 41.5 | 50.2 | 59.1 | 63.4 | 72.0 |
| Allethrin | 1.3 | 4.2 | 13.6 | 24.9 | 32.7 | 39.8 | 51.0 | 57.9 | 64.5 |

*Example 25*

A 100 ml. refined kerosene solution containing 0.4 g. of N - (chrysanthemoxymethyl) - 1 - cyclohexene - 1,2-dicarboximide was prepared.

In a glass box of 70 cm. cube, about 30 housflies (adult) were liberated, and 0.3 ml. of the thus-prepared 0.4% oil preparation was uniformly sprayed with an atomizer into the box. Knock-down number of the houseflies according to the lapse of time were observed. Similarly, a 0.4% oil preparation containing allethrin was tested for comparison.

Concentration of the
ingredient, percent                                         Mortality, percent
 2.0 _____ 91.5
 1.0 _____ 67.2
 0.5 _____ 40.1

*Knock-down ratio of houseflies according to the lapse of time, percent*

|  | 30 sec. | 42 sec. | 1 min. | 1½ min. | 2 min. | 2⅚ min. | 4 min. | 5⅔ min. | 8 min. |
|---|---|---|---|---|---|---|---|---|---|
| The present compound | 5.8 | 25.0 | 42.3 | 55.8 | 61.6 | 65.5 | 73.4 | 79.8 | 86.6 |
| Allethrin | 4.2 | 7.6 | 20.4 | 43.8 | 56.0 | 64.5 | 71.2 | 80.9 | 86.7 |

*Example 26*

A solution of 1.5 g. of N-(chrysanthemoxymethyl)-1-cyclohexene-1-carboxy-2-thiocarboximide in 20 g. of acetone was mixed with 98.5 g. of 200 mesh talc, and the acetone was evaporated from the mixture to leave 1.5% dust preparation.

Each 1 g. of the resulting 1.5% dust preparation was sprayed to houseflies (adult) in a settling tower within 5 seconds. After 10 seconds, the shutter was opened and the houseflies were exposed to the sprayed air for 10 minutes and then taken out from the tower. The houseflies were kept at a constant temperatures and the mortality was examined after 20 hours. The mortality was 92.7%.

*Example 27*

In similar way as in Example 22, a 100 ml. refined kerosene solution containing 0.5 g. of N-(chrysanthemoxy-

*Example 29*

A solution of 1.5 g. of N-(pyrethroxymethyl)-1-cyclohexene-1,2-dicarboximide in 50 ml. of acetone was uniformly mixed with 98.5 g. of a mosquito coil carrier (a blend of tabu powder and pyrethrum marc in 2:3 proportion by weight). After evaporation of acetone, the mixture was kneaded with 180 ml. of water. The kneaded product was molded and dried to yield a mosquito coil containing 1.5% ingredient.

In a glass box of 70 cm. cube, about 30 common mosquitos (adults) were liberated. One gram piece of the 1.5% mosquito coil was held horizontally at the center of the bottom of the box and lit at the both ends. Knock-down ratio of the mosquito according to the lapse of time was observed. Similarly a 0.6% mosquito coil containing allethrin was prepared for comparison.

*Knock-down ratio of houseflies according to the lapse of time, percent*

|  | 30 sec. | 42 sec. | 1 min. | 1½ min. | 2 min. | 2⅚ min. | 4 min. | 5⅔ min. | 8 min. |
|---|---|---|---|---|---|---|---|---|---|
| The present compound (0.5%) | 6.8 | 11.4 | 18.2 | 29.6 | 40.7 | 60.4 | 68.5 | 75.4 | 84.1 |
| Allethrin (0.3%) | 4.4 | 7.0 | 13.7 | 20.8 | 38.4 | 54.5 | 61.3 | 70.5 | 82.2 |

*Knock-down ratio of common mosquito according to the lapse of time, percent*

|  | 3 min. | 6 min. | 12 min. | 24 min. | 48 min. |
|---|---|---|---|---|---|
| The present compound | 1.1 | 4.2 | 16.5 | 35.0 | 84.8 |
| Allethrin | 2.1 | 13.5 | 29.2 | 43.6 | 93.0 |

*Example 30*

In similar way as in Example 22, a 100 ml. refined kerosene solution containing 0.3 g. of N-(pyrethroxymethyl)-3-acetoxy-4-cyclohexene-1,2 - dicarboximide and 3 g. of xylene was prepared and tested. Similarly a 0.3% oil preparation containing allethrin was tested for comparison.

*Knock-down ratio of houseflies according to the lapse of time, percent*

|  | 30 sec. | 1 min. | 2 min. | 4 min. | 8 min. |
|---|---|---|---|---|---|
| The present compound (0.3%) | 1.8 | 18.9 | 56.4 | 72.7 | 84.6 |
| Allethrin (0.3%) | 2.7 | 14.5 | 46.8 | 68.3 | 80.4 |

What we claim is:

1. A cyclopropanecarboxylic acid ester of the general formula,

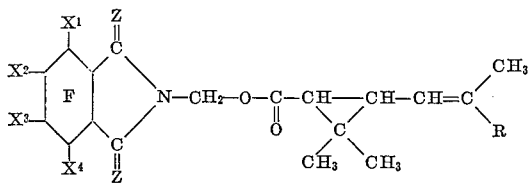

wherein $X^1$, $X^2$, $X^3$, and $X^4$ each means a member selected from the group consisting of hydrogen, chloro, bromo, methyl and acetoxy; Z is a member selected from the group consisting of oxygen and sulfur atoms; F means a double bond at any position of the cyclohexane nucleus, and R is a member selected from the group consisting of methyl and methoxycarbonyl.

2. A compound selected from the group consisting of N-(chrysanthemoxymethyl) - 4 - cyclohexene - 1,2-dicarboximide and N-(chrysanthemoxymethyl)-1-cyclohexene-1,2-dicarboximide.

3. A compound selected from the group consisting of N - (chrysanthemoxymethyl)-3-methyl-4-cyclohexene-1,2-dicarboximide, N - (chrysanthemoxymethyl)-4-methyl-4-cyclohexene-1,2-dicarboximide, N-(chrysanthemoxymethyl)-5-methyl-1-cyclohexene - 1,2 - dicarboximide, and N-(chrysanthemoxymethyl)-3-methyl - 1 - cyclohexene-1,2-dicarboximide.

4. N-(chrysanthemoxymethyl) - 3 - chloro - 4 - cyclohexene-1,2-dicarboximide.

5. N-(chrysanthemoxymethyl) - 1 - cyclohexene - 1-carboxy-2-thiocarboximide.

6. N-(chrysanthemoxymethyl) - 3 - acetoxy - 4 - cyclohexene-1,2-dicarboximide.

7. A compound selected from the group consisting of N - (pyrethroxymethyl)-1-cyclohexene-1,2-dicarboximide and N - (pyrethroxymethyl)-3-cyclohexene-1,2-dicarboximide.

8. A composition comprising a carrier and as the essential ingredient an insecticidal amount of a cyclopropanecarboxylic acid ester having the formula

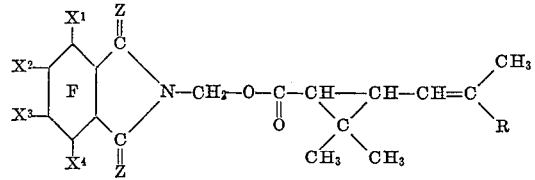

wherein $X^1$, $X^2$, $X^3$, and $X^4$ each means a member selected from the group consisting of hydrogen, chloro, bromo, methyl and acetoxy; Z is a member selected from the group consisting of oxygen and sulfur atoms; F means a double bond at any position of the cyclohexane nucleus, and R is a member selected from the group consisting of methyl and methoxycarbonyl.

9. A composition comprising at least one member selected from the group consisting of methylnaphthalene, kerosene and xylene and as the essential ingredient an insecticidal amount of a cyclopropanecarboxylic acid ester having the formula

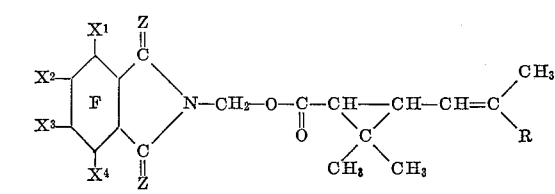

wherein $X^1$, $X^2$, $X^3$, and $X^4$ each means a member selected from the group consisting of hydrogen, chloro, bromo, methyl and acetoxy; Z is a member selected from the group consisting of oxygen and sulfur atoms; F means a double bond at any position of the cyclohexane nucleus, and R is a member selected from the group consisting of methyl and methoxycarbonyl.

10. A composition comprising an emulsifier and as the essential ingredient an insecticidal amount of a cyclopanecarboxylic acid ester having the formula

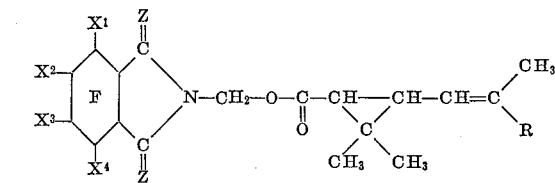

wherein $X^1$, $X^2$, $X^3$, and $X^4$ each means a member selected from the group consisting of hydrogen, chloro, bromo, methyl and acetoxy; Z is a member selected from the group consisting of oxygen and sulfur atoms; F means a double bond at any position of the cyclohexane nucleus, and R is a member selected from the group consisting of methyl and methoxycarbonyl.

11. A composition comprising a powdered solid carrier and as the essential ingredient an insecticidal amount of a cyclopropanecarboxylic acid ester having the formula

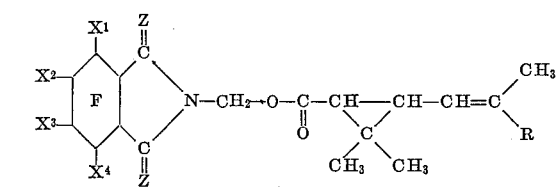

wherein $X^1$, $X^2$ $X^3$, and $X^4$ each means a member selected from the group consisting of hydrogen, chloro, bromo, methyl and acetoxy; Z is a member selected from the group consisting of oxygen and sulfur atoms; F means a double bond at any position of the cyclohexane nucleus, and R is a member selected from the group consisting of methyl and methoxycarbonyl.

References Cited by the Examiner

UNITED STATES PATENTS

| | | | |
|---|---|---|---|
| 2,487,106 | 11/1948 | Cornwell | 260—326 |
| 2,872,450 | 2/1959 | Sasse et al. | 260—326 X |
| 2,914,530 | 11/1959 | Schrader et al. | 260—326 X |
| 3,152,138 | 10/1964 | Aichenegg et al. | 260—326 X |

OTHER REFERENCES

Cram et al.: Organic Chemistry, McGraw-Hill Book Co., Inc., New York, 1959, pages 75–77.

Nefkens: Nature, vol. 193, 1962, pages 974–975.

ALEX MAZEL, *Primary Examiner.*

HENRY R. JILES, *Examiner.*

MARY U. O'BRIEN, *Assistant Examiner.*